United States Patent [19]

Woodworth

[11] Patent Number: 5,111,059

[45] Date of Patent: May 5, 1992

[54] POWER TRANSFER UNIT FOR TRANSFERRING POWER SUPPLIED TO A LOAD BETWEEN POWER SOURCES RESPONSIVE TO DETECTED SCR GATE-CATHODE VOLTAGE

[75] Inventor: George K. Woodworth, Gainsville, Va.

[73] Assignee: International Business Machines Corporation, Armonk, N.Y.

[21] Appl. No.: 566,928

[22] Filed: Aug. 14, 1990

[51] Int. Cl.$^5$ ............................. H02J 3/00; H02J 9/06; H03K 17/30
[52] U.S. Cl. ........................................ 307/87; 307/64; 307/643
[58] Field of Search ................. 307/86, 85, 64, 65, 307/70, 80, 81, 631, 647, 643; 323/271

[56] References Cited

U.S. PATENT DOCUMENTS

| | | | |
|---|---|---|---|
| 4,298,810 | 11/1981 | Dinger | 307/643 |
| 4,445,183 | 4/1984 | McCollum et al. | 364/483 |
| 4,525,752 | 6/1985 | Norris | 307/134 |
| 4,564,413 | 4/1987 | Bourbeau | 307/87 |
| 4,801,828 | 1/1989 | Ishikawa et al. | 307/646 |
| 4,811,163 | 3/1989 | Fletcher | 307/64 |
| 4,876,468 | 10/1989 | Libert | 307/643 |
| 4,879,624 | 11/1989 | Jones et al. | 361/65 |

Primary Examiner—A. D. Pellinen
Assistant Examiner—Richard Elms
Attorney, Agent, or Firm—Mark A. Wurm

[57] ABSTRACT

Switching of three phase wye power can be efficiently completed without synchronization between two or more energy sources. The absence of synchronism can be overcome by switching one source off and then in a very short time frame restoring the power from the second power source. The duration of the outage can be controlled and minimized so that the load never loses energy long enough to cause an operational problem. The interruption time period in this description is limited to about 100 microsecond span; long enough to avoid interaction between the separate power sources, yet short enough to be transparent to the load. Electrical transfer of loads between power sources may be controlled precisely if the switching is accomplished using solid state electronic devices. Electronic switching is more reliable and does not generate the arcs during transfers that shorten the life span of mechanical contactors. Electrical switching devices are very efficient and handle high peak power levels; however, their internal losses dissipate heat. These resistive heating losses require cooling to avoid thermal destruction and this cooling adds significant weight and size penalties to a solid state switch. The power transfer unit (PTU) allows power contactors to transfer power from a number of power sources in a controlled manner to minimize disruption at the load. The PTU utilizes a logic controlled electronic switch in parallel with the contacts of a power control relay. The combination of an electronically controlled switch and an electromechanical relay provide precise switch timing with minimum power dissipation, in a package similar in size to that of a power relay alone. The physical package of the PTU relay may be similar in size to the present relay due to the elimination of arc quenching components and over-designed contacts.

5 Claims, 12 Drawing Sheets

PHASE RELATIONSHIPS DURING 3 PHASE WYE POWER TRANSFERS
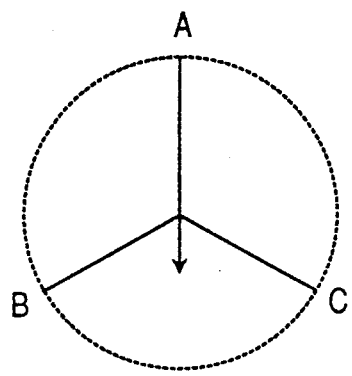
TYPICAL POWER SYSTEM
LINE VOLTAGE RELATIONSHIP
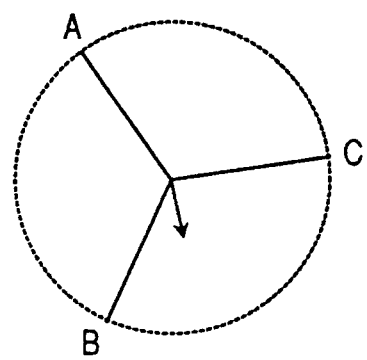
ROTATION OF STANDARD
PHASE RELATIONSHIPS
CROSS CONNECTED POWER
SYSTEM PHASE ALIGNMENT
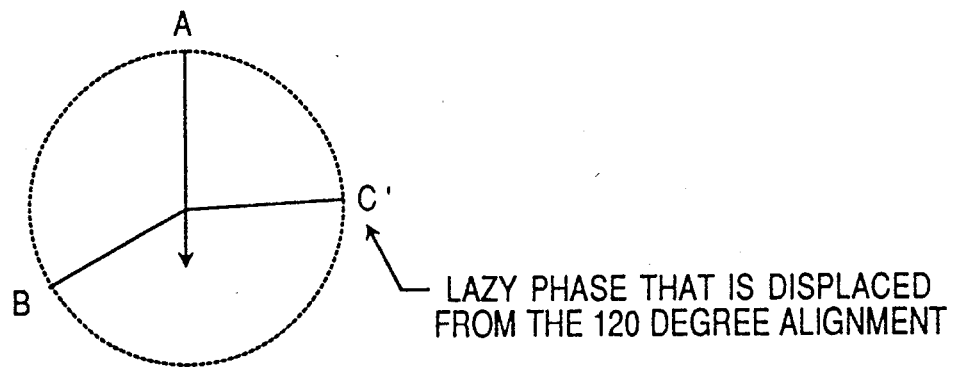
— LAZY PHASE THAT IS DISPLACED
FROM THE 120 DEGREE ALIGNMENT
THE C PHASE OF THE FIRST POWER SOURCE
WAS REPLACED BY THE NEW C' PHASE FROM
THE SECOND SOURCE IN THIS EXAMPLE
*FIG. 6*

FIG. 7  POWER TRANSFER UNIT BLOCK DIAGRAM

SCR GATE DRIVER AND DETECTOR CIRCUIT

POWER TRANSFER BLOCK DIAGRAM

FIG. 12
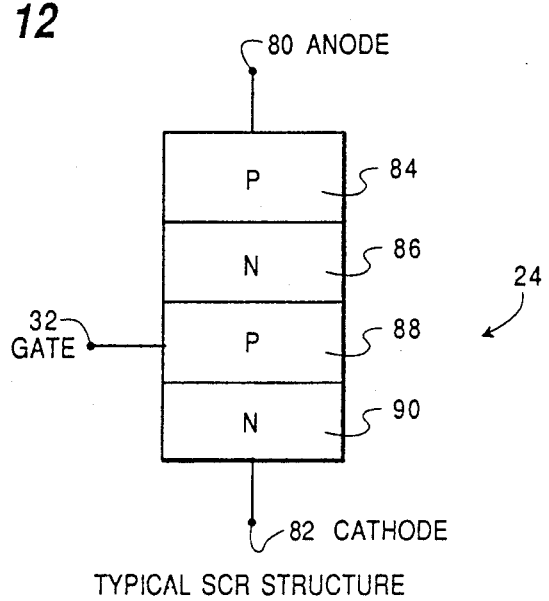
TYPICAL SCR STRUCTURE
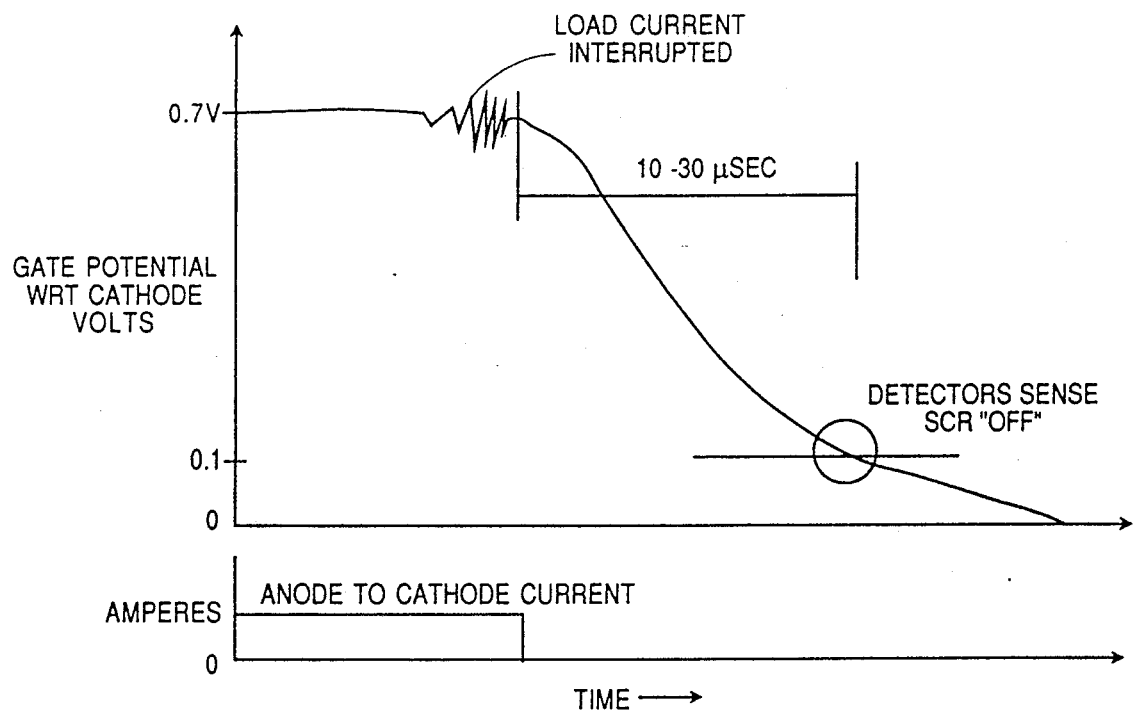
FIG. 13

POWER TRANSFER UNIT FOR TRANSFERRING POWER SUPPLIED TO A LOAD BETWEEN POWER SOURCES RESPONSIVE TO DETECTED SCR GATE-CATHODE VOLTAGE

DESCRIPTION

BACKGROUND OF THE INVENTION

1. Technical Field

The invention disclosed broadly relates to power circuits and methods and more particularly relates to an improved power transfer circuit for maintaining continuity during power transfer operations.

2. Background Art

Switching of power systems from one source of energy to another frequently causes unwanted interruptions to the operation of electronic equipment. The duration of this outage is sufficient to cause loss of volatile data and frequently resets the operation of complex electrical machines. Power switching events often occur in situations such as the transfer from ground to on-board power in present aircraft designs. Power switching is also required by the power utility companies for the rotation of equipment during maintenance or recovery from equipment failures.

The speed of operation of an electro-mechanical contactor is dependent on its construction, temperature, position, and the voltage applied to the coil. It is not advisable for several contactors to be interconnected for the purpose of switching power without allowing sufficient "dead time" between them to eliminate overlap. Variability in relay timing necessitates a time period many milliseconds wide to eliminate overlap during sequential switching of relays. Repeatable power outages as short as a few milliseconds in duration are difficult to achieve with relays and are still too long for sensitive electrical equipment to tolerate. Unsynchronized power systems must never be interconnected as the relative voltage differences would generate very large currents to realign the alternators in an explosive fashion and would probably destroy both machines. There is a severe risk of electrical and mechanical damage if asynchronous power systems are electrically connected together without special precautions.

OBJECTS OF THE INVENTION

It is therefore an object of the invention to provide an improved power transfer circuit which prevents unwanted interruptions during the transfer of power from one source to another.

It is another object of the invention to provide an improved power transfer circuit which will transfer loads between power sources in a more precise manner than has been available in the prior art.

It is still a further object of the invention to provide an improved power transfer circuit which does not generate arcs during transfers of power.

It is yet another object of the invention to provide an improved power transfer circuit which allows power contactors to transfer power from a number of power sources in a more controlled manner than has been available in the prior art.

SUMMARY OF THE INVENTION

These and other objects, features and advantages of the invention are accomplished by the improved power transfer circuit disclosed herein.

Switching of three phase wye power can be efficiently completed without synchronization between two or more energy sources. The absence of synchronism can be overcome by switching one source off and then in a very short time frame restoring the power from a second power source. The duration of the outage can be controlled and minimized so that the load never loses energy long enough to cause an operational problem. The interruption time period in this description is limited to about 100 microsecond span; long enough to avoid interaction between the separate power sources, and short enough to be transparent to the operation of the load equipment.

Electrical transfer of loads between power sources may be controlled precisely if the switching is accomplished using solid state electronic devices. Electronic switching is more reliable and does not generate any electrical arcs during transfers that shorten the life span of mechanical contactors. Solid state switching devices are very efficient and handle high peak power levels; however, their internal losses dissipate heat. These heating losses require cooling to avoid thermal destruction and this cooling can add significant weight and size penalties to a solid state switch.

The power transfer unit (PTU) allows multiple power contactors to transfer power from a number of power sources in a controlled manner to minimize disruption of the load. The PTU utilizes a logic controlled electronic switch in parallel with the contacts of a power control relay. The combination of a logically controlled solid state switch and an electro-mechanical relay provide precise switch timing with minimum power dissipation, in a package similar in size to that of a power relay alone. The physical package of the PTU and its associated relay may be similar in size to the present relay design due to the elimination of arc quenching components and the need for over-designed contacts, otherwise required to handle arcing.

BRIEF DESCRIPTION OF THE DRAWINGS

These and other objects, features and advantages of the invention will be more fully appreciated with reference to the accompanying figures.

FIG. 6 illustrates a "lazy phase" and indicates that the new source phase may fall into the old power source phase at any relative phase angle.

FIG. 12 is a detailed representation of a SCR.

FIG. 13 is a SCR off-state gate voltage plot.

DESCRIPTION OF THE BEST MODE FOR CARRYING OUT THE INVENTION

Figure 1:
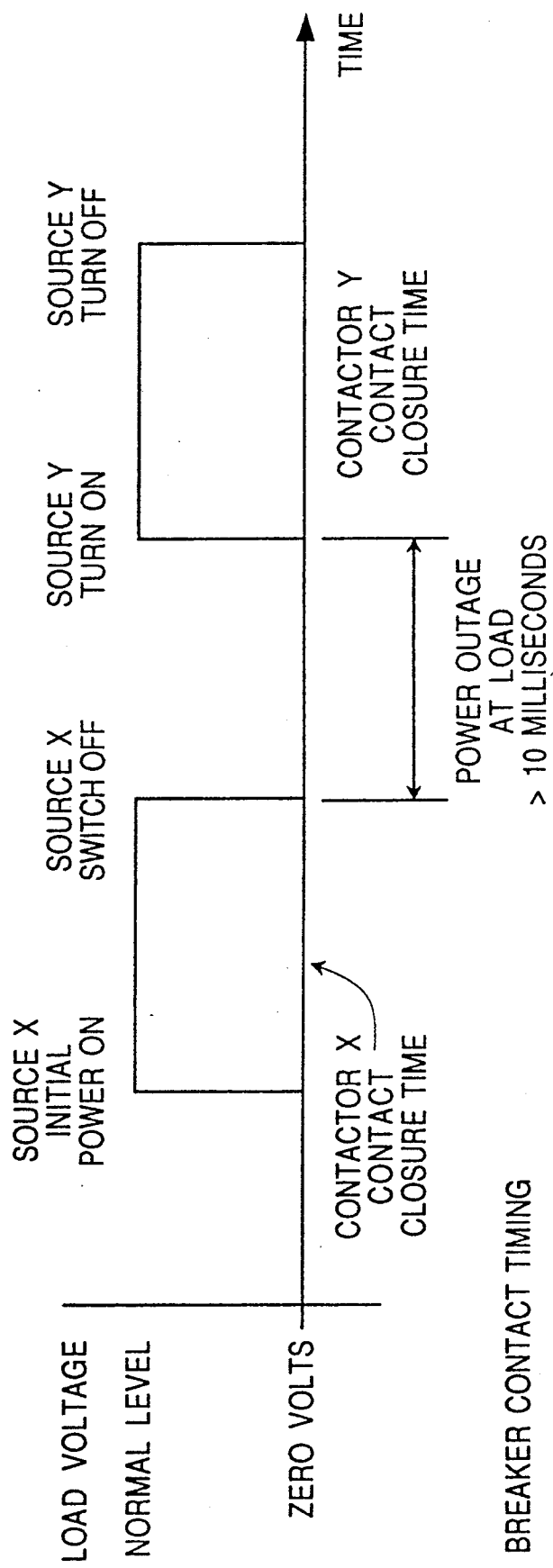
FIG. 1 shows the timing operation of a pair of power control relays alternately feeding energy to a load.
Figure 2:
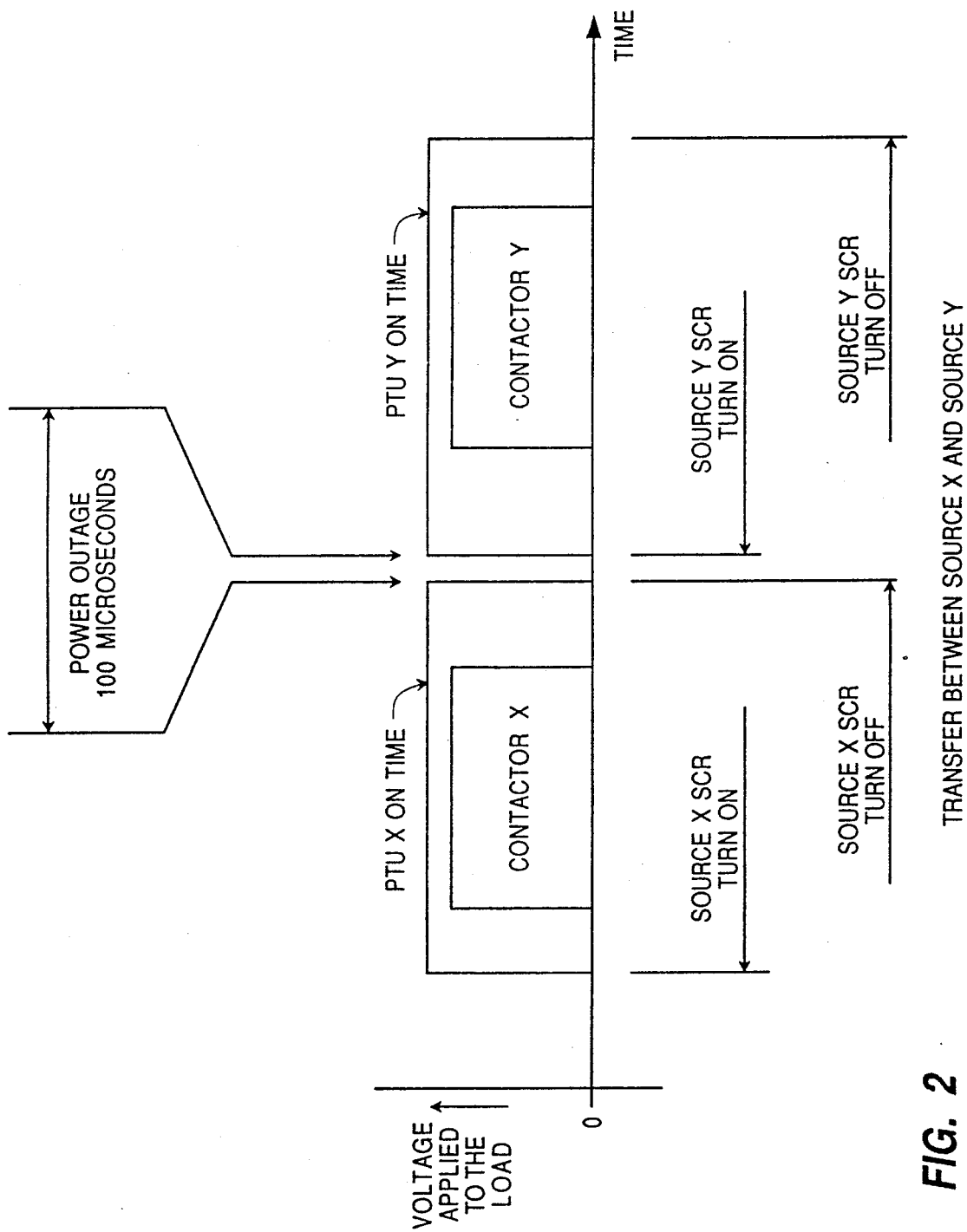
FIG. 2 illustrates the power transfer unit paralleling the timing of the relay contacts of FIG. 1 to allow a shorten controlled time span during which the load is separated from either source of power.
Figure 3:
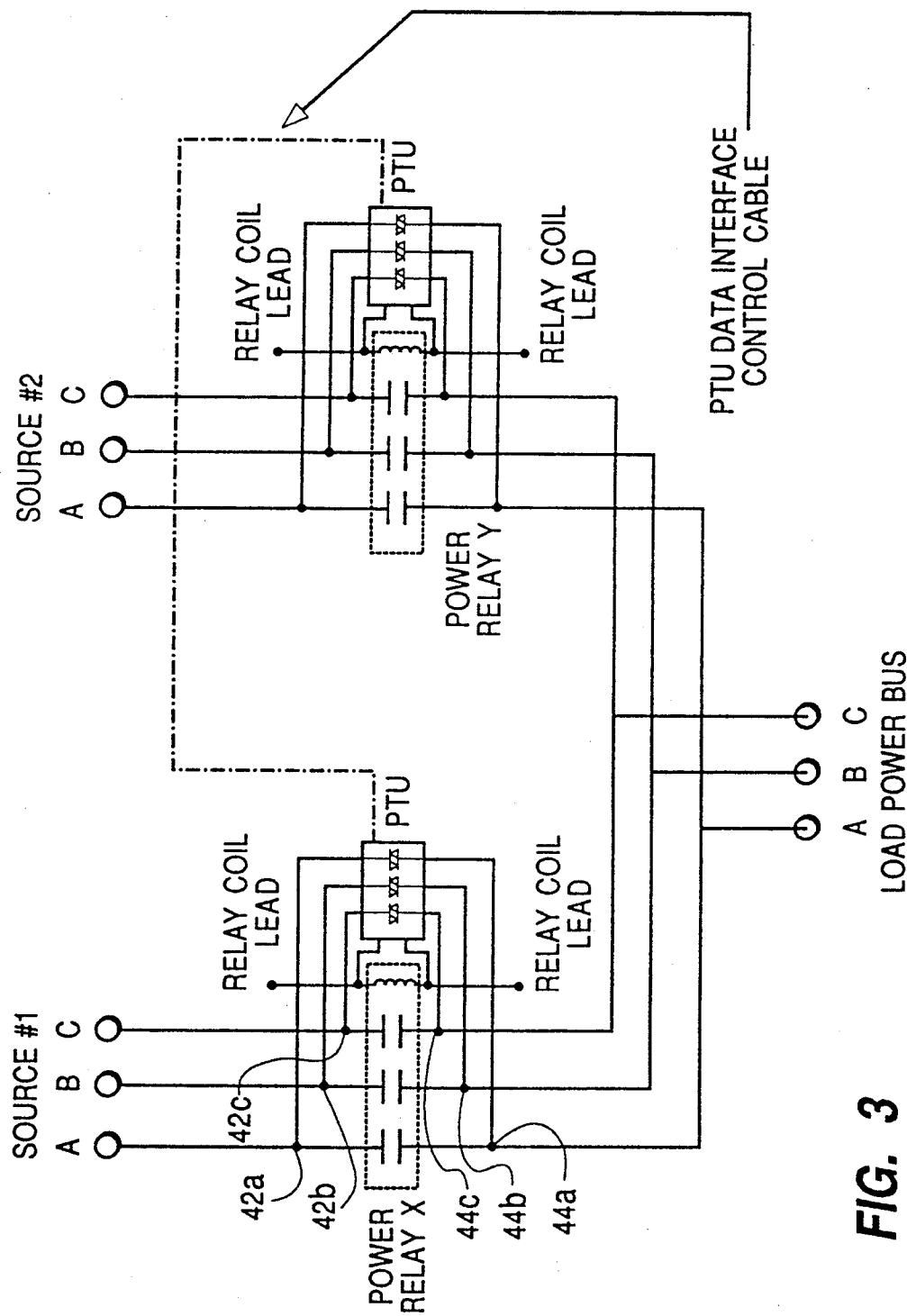
FIG. 3 shows a block diagram of two power transfer circuits and their power control relays and the data interface control cable.

FIG. 1 shows the timing operation of a pair of power control relays feeding energy to a load. The power outage time is in excess of 10 milliseconds due to the "underlap" needed to compensate for the variability of relay timing. In FIG. 2 a pair of PTUs is shown paralleling the timing of two sets of relay contacts to allow a smaller "underlap" time span during which the load is separated from either source of power. FIG. 3 shows the block diagram of the two PTUs, their power control relays, and the PTU data interface cable. This figure uses bold lines for the main power cables feeding the PTU and the relay contacts.

Figure 4:
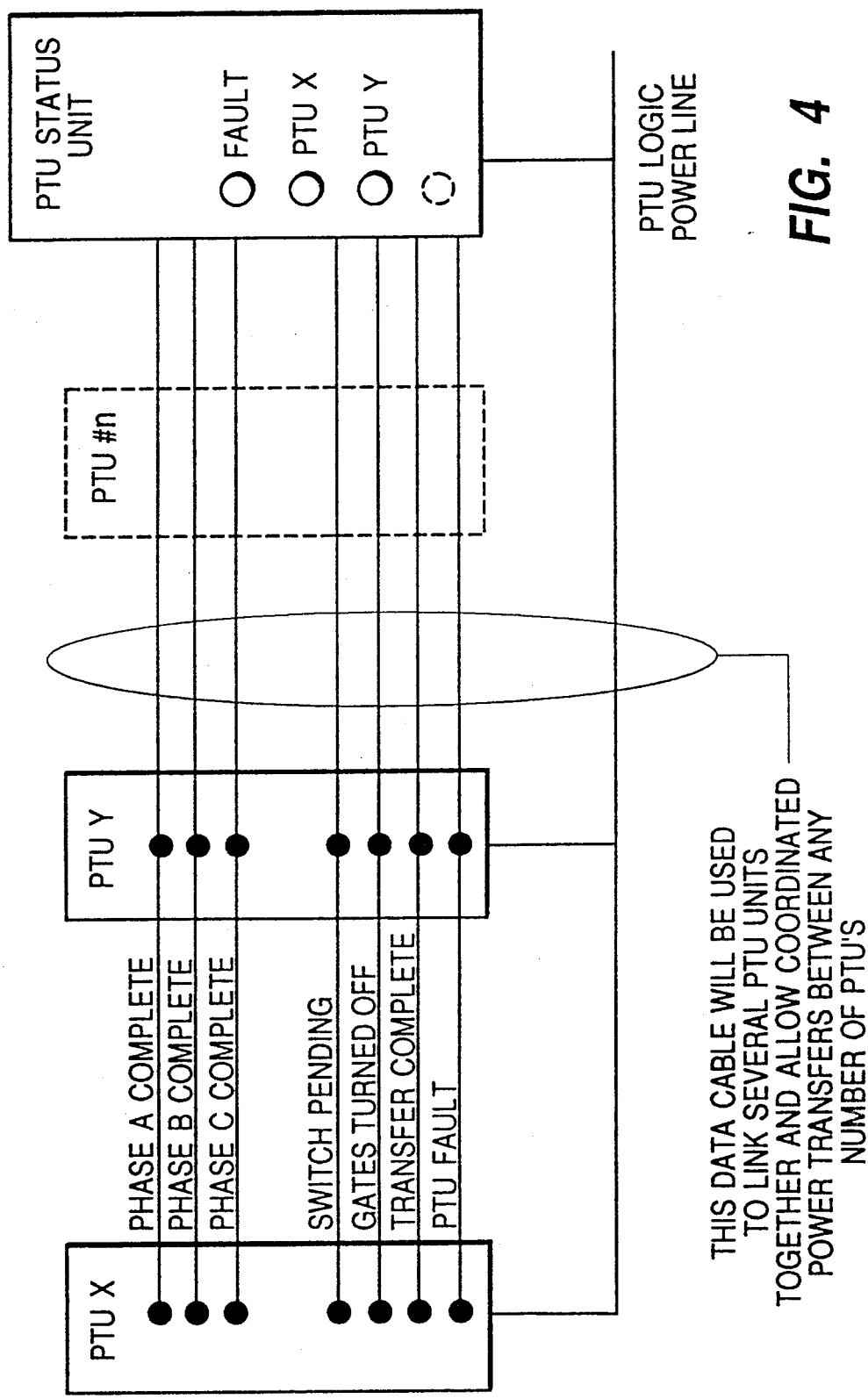
FIG. 4 illustrates the data interconnection cable that is used to tie the operation of two power transfer circuits together and to coordinate their timing.
Figure 5:
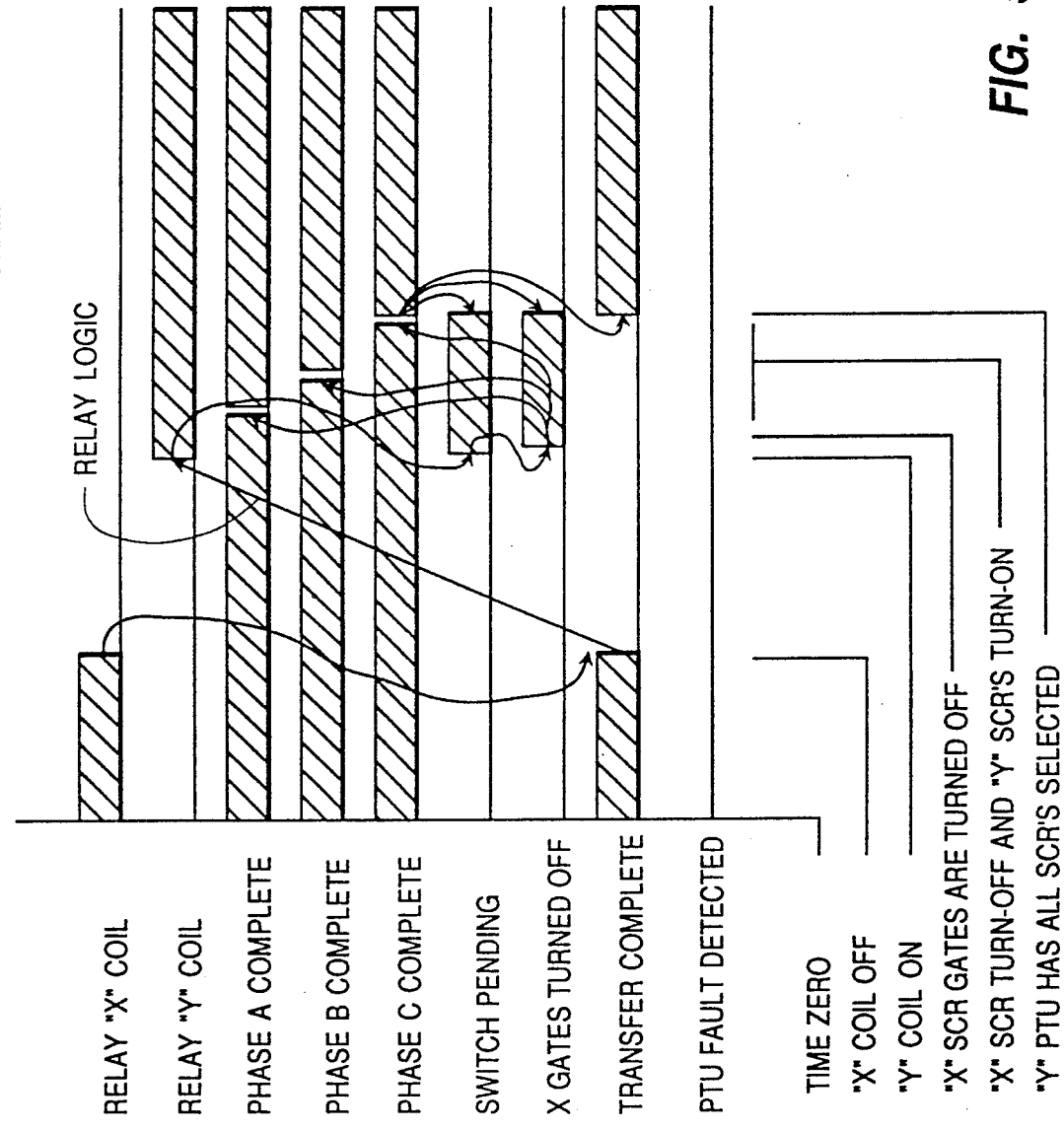
FIG. 5 is a timing diagram of the handshaking data flow and indicates the progression of control lines during a power transfer unit-to-power transfer unit control transfer.
Figure 9:
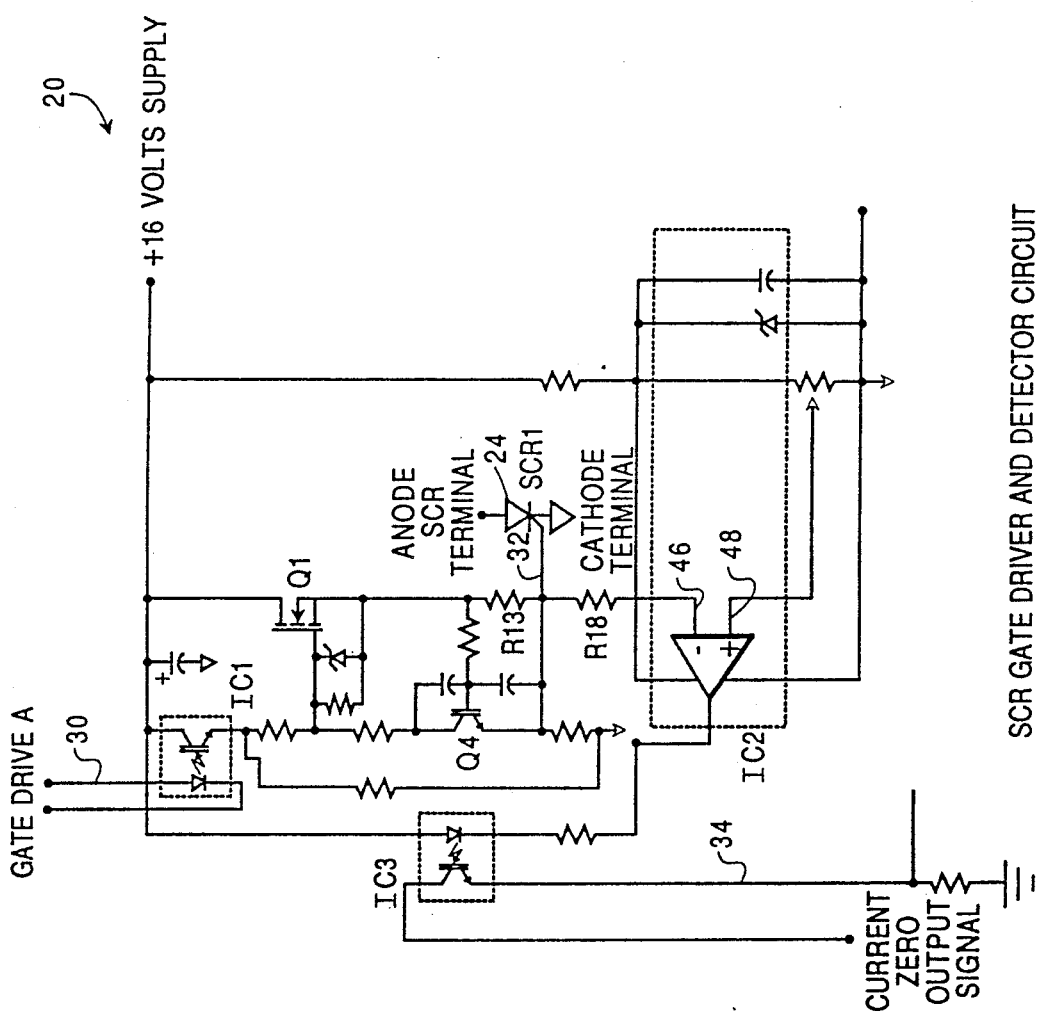
FIG. 9 shows a circuit schematic diagram of a gate conduction detector circuit.

FIG. 4 illustrates the data interconnection cable used to tie the operation of several PTUs together and coordinate their timing. The lines that show the representative "phase X complete" indicate current passage through the PTU SCRs associated with that phase. The gate conduction detector circuit shown in FIG. 9 is used to monitor current in the SCRs and detect the ability of the SCR to block current. These data lines are used to sequence the SCRs in the "new" PTU assembly and thereby limit the outage of power to 100 microseconds on any phase. The other control lines are involved with the handshaking of the data controls between the two PTUs associated with a power transfer. FIG. 5 is a timing diagram of the handshaking data flow and indicates the progression of control lines during a typical PTU-to-PTU assisted transfer of power relays "X" and "Y."

A PTU turns on the parallel path silicon controlled rectifiers (SCRs) as soon as that PTU's associated relay coil is energized, if no other PTUs are already supplying the load. The SCR devices become fully conductive in microseconds and can handle any load inrush currents while the relay's inertia delays closure of the mechanical contacts for several milliseconds. The relay contacts then close and shunt current around the approximate 2 volt SCR drop without arcing, eliminating resistive heating losses in the PTU's SCRs.

A novel feature of the PTU is that it communicates with other PTU devices to perform a coordinated load transfer from one source to the other. As one power source selection is substituted for another, the PTUs collectively control the duration of the source isolation gap on a phase-by-phase basis using the phase complete lines. Coordination of PTU timing occurs during the time interval when the first relay has been turned off and before the new relay closes. This cooperative handoff of power between PTUs shortens the time gap during the break before make switching. Each PTU has a monitor to indicate the state of conduction for each power line SCR within it. The SCR conduction status for any "old" PTU is available over a dedicated bus to all other PTUs for the purpose of inter-device control. Each "new" PTU SCR set turn-on timing is controlled by the turn-off of a corresponding phase in the "old" PTU. PTU controls timing to allow a power interruption of a predetermined duration for each phase independent of the reaction speed of the associated contactors.

The PTU is designed to "make the circuit" before the contactor can close and "opens the circuit" after the contactor opens. In an example case, two contactors are used to alternately connect a load of a pair of non-synchronous wye configuration power sources. Each contactor has a PTU connected in parallel with it as indicated on the FIG. 3 drawing. When contactor "X" has coil current supplied, the "X" PTU enables all three line SCR sections and begins to conduct full load power. At 10–20 milliseconds later, the contactor mechanically closes and carries the load current by shunting the SCRs, thereby stopping power dissipation within them. The sequence of events described is typical of PTU operation when no other PTUs are switched on.

When the contactor coil is de-energized, the contacts will remain closed for several milliseconds due to inertia, and continue to conduct power to the load. The SCR elements are continuously gated on for a specific period to eliminate arcing as the contacts begin to open. The duration of the PTU "overlap" is adjusted to be long enough to overlap the closure of the alternate contactor if it is selected. In a power transfer sequence this SCR conduction period will be on the order to 50–100 milliseconds and therefore causes minimal heating of the PTU. If no "new" contactor/PTU path is selected, the timer in the PTU switches the SCRs off and removes energy from the load.

If the alternate power control relay (Y) were selected to source the load, the application of current to the coil of the "new" relay Y would cause the Y PTU to send a switch pending status signal to the X PTU, causing it to turn off all of its SCRs before the internal time-out interval elapses. This action stops the overlap action in the X PTU and allows the Y PTU to start conducting power before the slower mechanical contacts of the Y relay can close. As the X PTU current monitors indicate that a specific phase has stopped conducting power, a "phase complete" logic signal is sent to the Y PTU, to cause it to turn on the SCRs associated with the same power line phase after a 100 microsecond delay.

The X PTU SCRs all eventually lose the ability to conduct power to the load, this delay is dependent on the load power factor and angular position of rotation of the source. An SCR will not cease conduction when the gate drive is removed, but is delayed until the load current through it decays below a minimum threshold. Depending on the load and the power source, as much as one-half cycle of time may pass before a specific SCR falls out of conduction. Depending on the power line frequency, this time ranges from 1.25 to 8.33 milliseconds (400 to 60 Hz). This worst case time lag is however, shorter than the time required for the "new" power contactor to mechanically close and thus does not interfere with normal operation.

The PTU design provides a reliable method of interlocking multiple contactors to reduce the power outage associated with the opening and closing response times of mechanical relay contacts. Power is interrupted during the 100 microsecond gap provided to isolate the power sources.

Typically the line-to-line voltage of a wye power source is the square root of three (1.732) times the phase-to-neutral voltage. Given the worst possible combination of timing events during a transfer, the highest percentage a line-to-line voltage can deviate to, would be +27% above nominal. The vectorial edition of two 180 degree out-of-phase sources cross-connected together results in a line-to-line voltage twice that of the line-to-neutral voltage. In a typical 115 volt power system, the line-to-line voltage is 199.18 volts and during a worst case switch transition this would rise to 230 volts between two of the line terminals for less than one-third cycle. This voltage fluctuation is the result of a specific mismatch between two sources at switching time and would occur infrequently. The typical result would be a minor voltage sag as the load migrates to the new power source. This cross connection of sources creates a "lazy phase" graphically shown in FIG. 6 indicating how a new source phase may be connected with the old power source phases at any angle. This is not damaging and the worst error is +27% above nominal as described previously. All single-phase loads connected to either power source would be unaffected as the amplitude of the line-to-neutral would not deviate from the nominal RMS value during the switching time.

Figure 7:
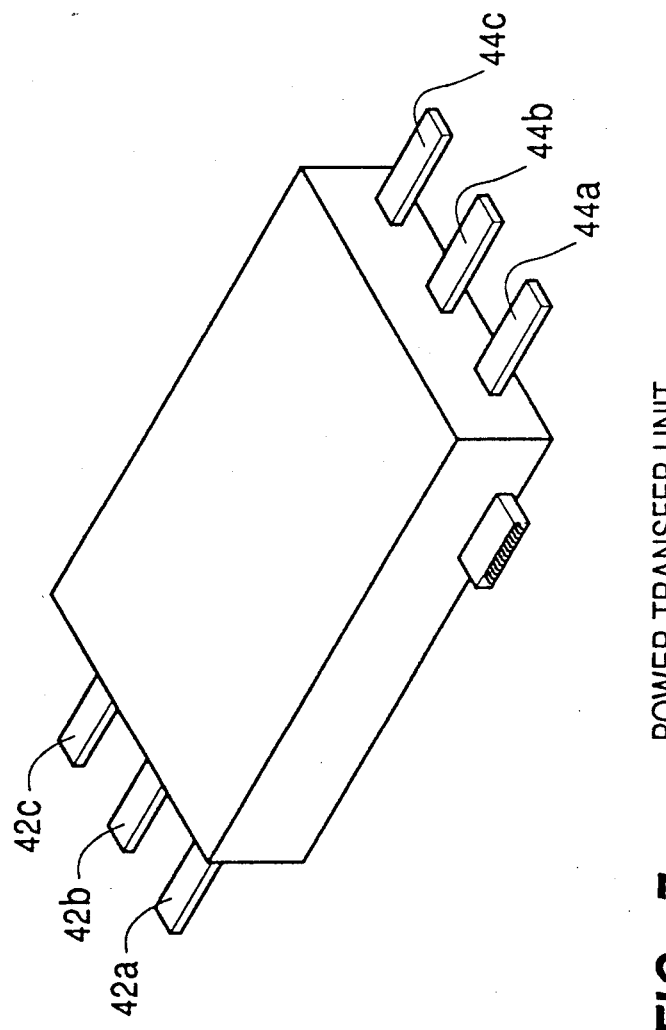
FIG. 7 shows a drawing of how a power transfer unit may be packaged.

FIG. 7 is a drawing of how a PTU may be packaged. The design is thin to allow the add-on PTU to be mounted under or on top of a power relay in an existing system. The PTU and relay package may be similar to a standard relay to allow replacement in present designs where space is limited and there is a need for protection from power outages during transfers.

Figure 8:
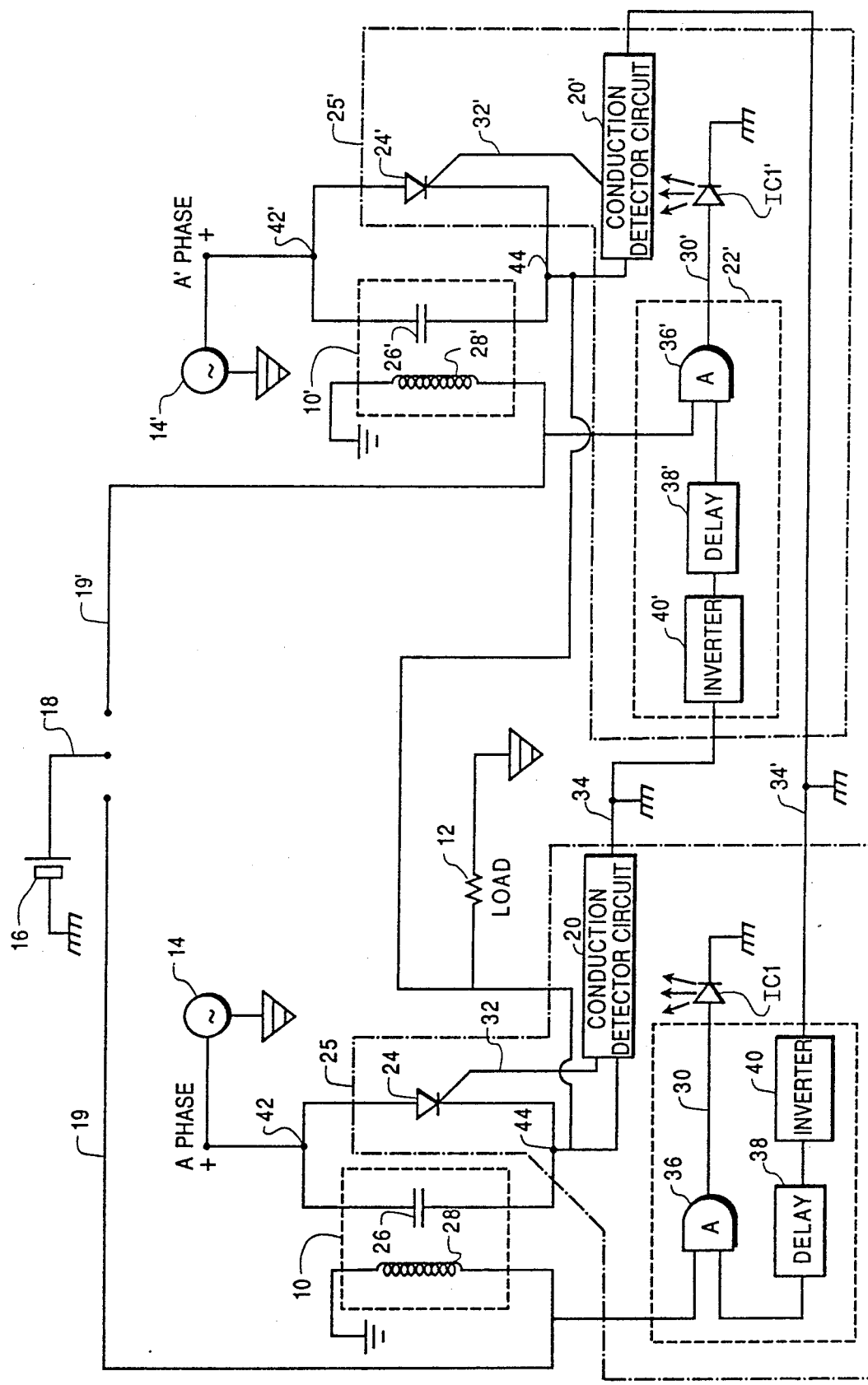
FIG. 8 is a circuit schematic diagram illustrating a one-half phase implementation of a power transfer unit.

FIG. 8 shows a gate detection control circuit which enables a transfer of power source to the A load from a first power source connected at A to a second power source connected at A'. A first SCR1 24 has its cathode-anode path connected between a first power source A and the A load and the second SCR2 24' has its cathode-anode path connected between the second power source A' and the A load. The objective is to detect when the current through SCR1 goes to zero and this is performed by a first gate conduction detector 20 which has a first input connected to the gate of SCR1 32 and has a second input connected to the cathode 44 of SCR1. A similar gate conduction detector circuit 20' is connected in a similar manner to the gate of SCR2 32' and the cathode 44' of SCR2. As was discussed above, the gate conduction detector will detect when the current through the cathode-anode path of SCR1 goes to zero. The gate conduction detector circuit 20 then outputs a signal to the logic control unit 22' of FIG. 8 which then initiates the transfer sequence to signal the SCR2 to turn on, thereby connecting the takeover power source A' to the load A. This operation can be seen to better advantage in the logic flow diagram of FIG. 11 which shows the sequence of operational steps in the monitoring and transfer of the sequence between the SCR1 and the SCR2.

Figure 10:
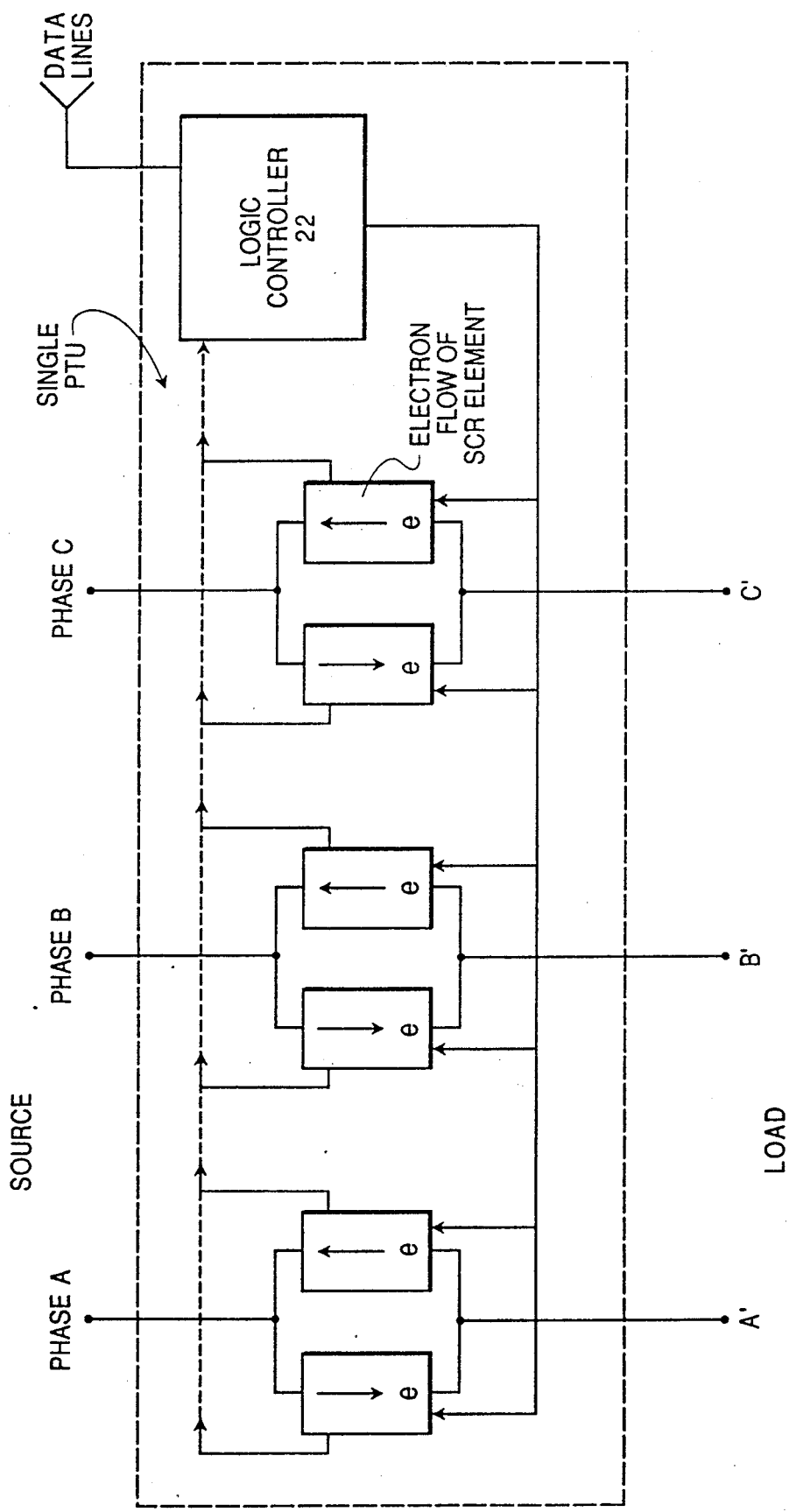
FIG. 10 is a circuit block diagram of an SCR array for a three phase power transfer unit.

The gate detection control circuit shown in FIG. 8 illustrates only a single polarity path. Shown in FIG. 10 is a six SCR array for a three phase power transfer unit, wherein two SCRs are coupled for each polarity A, B and C, each respective SCR handling current in its respective direction. This back-to-back arrangement of pairs of SCRs is used to provide full wave conduction.

Instrumentation may be used to monitor the source voltage or load voltage to determine the zero crossover points which anticipate the SCR turn-off. Electronic power supplies, reactive loads and distributed inductance in the power system can cause lagging phase currents that continue to flow after the source voltage passes through the electrical zero and reverses in polarity. This phase difference can lead to an error in measurement since the timing interval between the voltage zero cross-over point and the reversal of load current may be up to one fourth of a cycle or 90 electrical degrees.

"Real world" loads typically exhibit very abrupt current waveforms that contain multiple harmonic frequencies. These disruptive currents are a function of the power source and load operating conditions. Zero anode to cathode current detection becomes very difficult as the higher frequency components become more visible in the low amplitude regions for the current waveform. This increased noise floor significantly reduces the signal to noise ratio and contributes to greater measurement error in the determination of the SCR zero current turn-off point.

In applications utilizing SCRs, it is frequently necessary to determine the time during which an SCR is actually conducting energy. After an SCR is gated on, it can internally regenerate its own gate drive signal from the "load's" energy source that it is controlling. Until the load current is interrupted or is reduced to a level below a minimum sustaining level, the SCR will continue to be in a state of full conduction.

It has been discovered that it is possible to "look" into the gate of an SCR and determine the point at which the device loses the ability to conduct current. This characteristic is useful in circuits where timing considerations are important. This "noise free" gate signal is developed during the passage of load current through the SCR, results in a positive gate voltage signal measured with respect to the SCR's cathode. This regenerated gate potential is needed to forward bias the P-N junction between the cathode and gate junction. The amplitude needed to trigger the SCR into conduction is only a few volts. After the SCR has been turned on, if sufficient load current is available, the SCR continues to create its own gate drive voltage. External gate drive is only needed for a few microseconds during turn-on in typical applications, after which time it may be removed.

By sensing the voltage potential from the gate to cathode, it is practical to determine the conduction status of the SCR. If the load and voltage source provide a suitable current path, the SCR will be conducting energy and the gate potential will be about 1.5 volts . . . without any external gate drive.

When external gate drive is removed and the load current falls below the minimum sustaining current for that SCR, the SCR gate potential will fall to zero volts. There is a delay between the removal of the gate drive signal and the decay of the gate voltage, which may require several microseconds. This delay is not an error in measurement, it is the time for required recombination of charge inside the SCR's junction. Reapplication of load voltage prior to this decay time could reinitiate SCR conduction due to the stored charges in the gate to cathode junction.

SCRs possess the ability to regenerate their own gate signal and like all diode devices can store charge within its P-N junctions. This storage of gate charges will allow the SCR to begin conduction again after the load current falls to zero, unless enough time has elapsed to allow the charge to dissipate. In critical applications, there is a significant benefit in knowing the precise point at which an SCR is completely off and capable of blocking an applied potential.

The measurement technique described here senses the amplitude of the SCR voltage at the gate terminal. After the driving signal is removed, the amplitude of the gate voltage with reference to the cathode is monitored. In this approach, a threshold voltage level of 0.1 volts is chosen to determine when the SCR is completely turned off. A voltage comparator provides a logical output level to indicate when the gate voltage exceeds a DC level of 0.1 volts.

The schematic in FIG. 9 shows one method of achieving gate threshold detection of an SCR using a comparator and voltage reference. The schematic shown has the negative input of a comparator connected to the gate of an SCR through a resistor. The resistor was added for short circuit protection and is not required otherwise. The positive input of IC2 is fed an adjustable threshold level, in this example set at 0.1 volts DC.

When the SCR is not conducting current and the external gate drive is not present, the comparator will indicate this status by outputting a high output logic level. This signal corresponds to that point at which the SCR is capable of blocking current and may be considered off. The speed and precision of this detection method in addition to the low cost provide an attractive method to monitor SCR devices. The signal at the SCR gate is a low DC level that has none of the disturbances present in the load current. This reduced noise detection approach replaces the need to monitor the load with zero current sensing devices.

In SCR circuits that utilize several SCRs, this gate detection approach can improve the system control by better describing each SCR's turn-off point. As stated previously, this gate monitoring of the SCR gate lead will indicate internal biasing and is essentially "load noise free." This cathode referenced signal affords a common drive and detection sense point for the operation of SCR devices.

Gate voltage decay provides a reliable indicator to show when the SCR actually loses the internal regenerative drive needed to sustain conduction. Monitoring a specific gate voltage point on a given device accurately defines the point at which that specific SCR can be considered to be non-conductive. This point tracks well with the internal die temperature of this device. Timing errors are removed in this method and it is not necessary to monitor a line current sensor to detect the passage of the circuit current through a zero value. An SCR zero line current valve can occur while the SCR is still internally forward biased, and at which point the SCR is able to restart conduction without additional external gate triggering.

Figure 11:
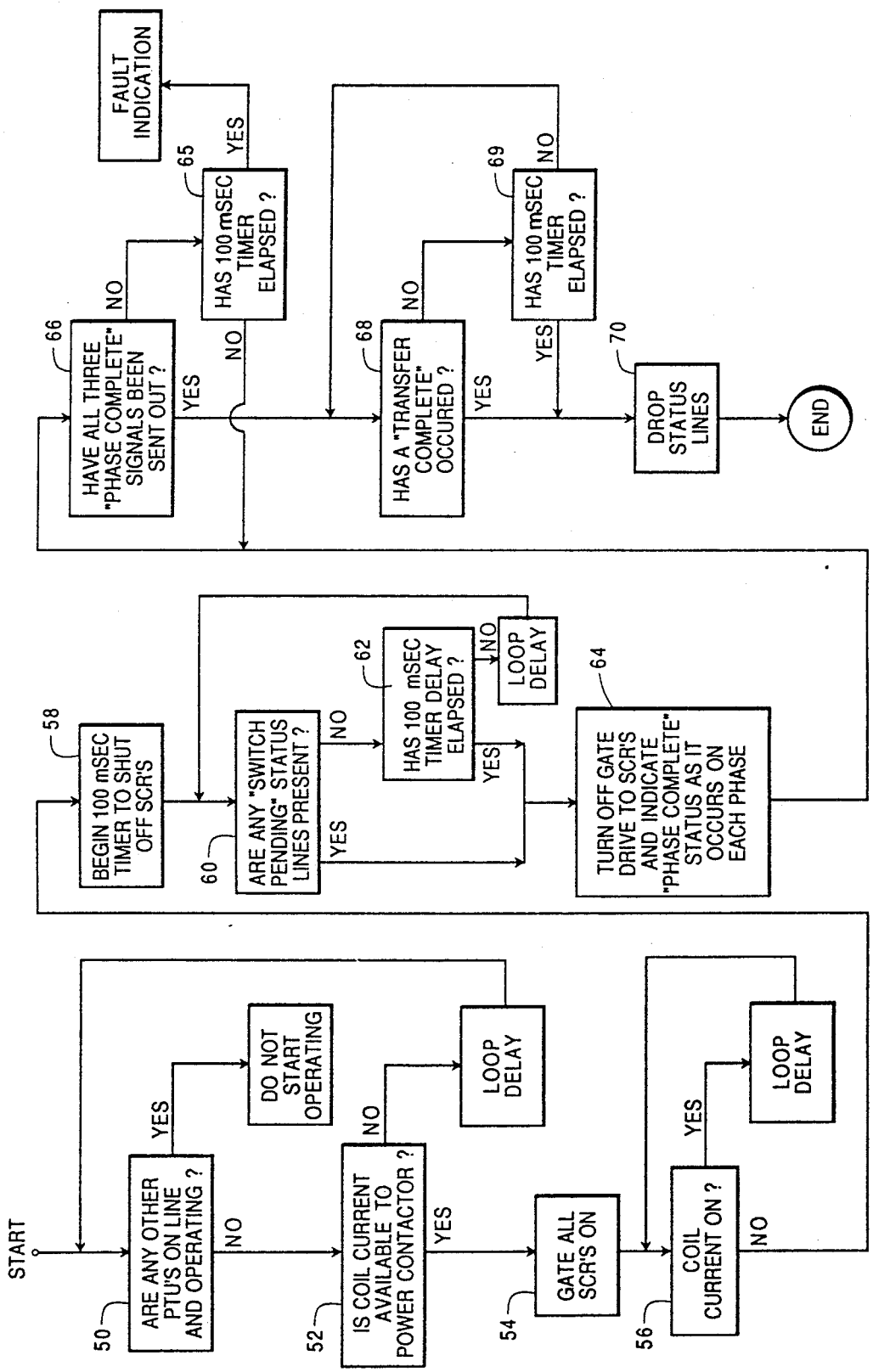
FIG. 11 illustrates a logic flow diagram of the monitoring and transfer sequence for inter-power transfer unit control.

In FIG. 11, the logic flow diagram starts with step 50 where it is determined whether there are any power transfer units on line. If there are any on line, then no operation is started. If none are on line, then the sequence flows to step 52 where it is determined whether a coil current is available. If no coil current is available, then a delay is forced. If coil current is available, then the sequence passes to step 54 where the system gates all SCRs on. The sequence then passes to step 56 where a determination is made whether the coil current is on and if it is on, then a loop delay is forced. If the coil current is not on, then the sequence passes to step 58 which begins a 100 millisecond timer to shut off the SCRs. The sequence then passes to step 60 where it is determined whether there are any "switch pending" status lines present. If there are no switch pending status lines present, then a loop delay is forced. If there are some "switch pending" status lines present, then the sequence goes to step 64. Step 64 turns off the SCRs and indicates each "phase complete" status line as it occurs. The sequence then passes to step 66 where it is determined whether all three "phase complete" states have occurred. If they have not occurred, then a delay is forced. If they have occurred, then the sequence passes to step 68 where it determines if a transfer complete has occurred. If no transfer complete has occurred, then it is determined in step 69 whether a 100 millisecond timeout interval has expired. If it has, then the sequence passes to step 70 where all status lines are dropped. If in step 68 the transfer complete is determined to have occurred, then once again the sequence passes to step 70 and all status lines are dropped.

In this manner, a smooth transition has been made between the breaking of conduction of a first SCR1 and the making of conduction of a second SCR2.

In the logic flow diagram of FIG. 11, step 62 determines whether the 100 millisecond timer has elapsed. If the 100 millisecond timer has not elapsed, then the flow returns to step 60 to determine if there are any "switch pending" status lines present.

In step 66 of FIG. 11, if it is determined that not all three phase complete states have occurred, then the sequence goes to step 65 which determines whether a predetermined number of milliseconds has elapsed. If that predetermined number of milliseconds has elapsed, then an apparent fault has occurred and a fault signal is output. If the predetermined number of milliseconds has not yet elapsed in step 65, then the sequence returns to step 66 to once again determine whether all three "phase complete" states have occurred.

The resulting power transfer unit provides power continuity during transfers between two or more wye configuration power sources that are not necessarily synchronized, in an improved manner.

FIG. 8, which is a half-phase diagram, shows some of the functional elements associated with the PTU. In those elements, it shows two relays: one from phase A and one from phase A' as two power sources. Those go through a set of contactors identified as relay 10 and relay 10', each of which is bridged by a parallel connection of SCR24 and SCR24', respectively. The SCRs in this design are controlled by device drivers DD which are identified as 20 and 20'. Those devices basically control the SCRs' operation by turning it on and also by monitoring its operation to indicate as is necessary, when the SCR is conducting on its own regenerative effect. The device drivers are connected together by data cables 34 and 34' which are shown in FIG. 8 and that are used to tie together logic control elements 22 and 22'. Between the combination of the two device drivers and detector circuits DDs 20 and 20' the logic controllers 22 and 22', allow the switching between phase A and the new source phase A' of the load. The load terminals have a common connection to A and A'.

FIG. 9 shows the device driver and the detector circuit. Basically the way the device operates is SCR1 is turned on by the device transistor Q1. Q1 is controlled through the opto isolator IC1. Whenever the gate drive signal A is turned on through the isolator, the photo current turns on transistor IC1 providing current to the gate of the transistor Q1. This current is supplied from a 16 volt power source which turns the transistor on. The current then feeds through resistor R13 into the gate of the SCR1. R13 is a very small resistor on the order of a few ohms and is merely used to provide enough sensing capability to enable the current control transistor Q4 to monitor and control the amount of drive supplied to Q1. This arrangement provides the current going to the gate of the SCR to be some value set by R13's threshold and controlled by Q4. This enables turning on a device from the 16 volt power source supplying gate current. At some time, it may be desirable to turn off the SCR1, whereupon the gate drive A to the photo diode is disconnected from the source of power. IC1 turns off, thereby removing the drive to Q1, which then causes the gate current feeding the SCR1 to turn off. SCR1, however, may not turn off immediately, because it may be at mid-cycle through the power conduction curve. This mid-cycle event would mean that the SCR1 could turn off, depending on the power line frequency, some number of milliseconds later. The time in which the SCR1 turns off can often be crucial in interconnecting several devices together. In this particular application, resistor R18 having several thousand ohms resistance, monitors the voltage at the gate of the SCR1. This voltage is compared to a reference voltage which on IC2 is provided a 100 millivolt threshold which is used as the reference. The comparator IC2 will monitor the gate voltage of the SCR and at the point in which the SCR's gate voltage diminishes below 100 millivolts, the output of IC2 will go logically low, and draw current from the 16 volt power supply through IC3's LED photo diode. This LED then provides output current through the opto isolator to turn on IC3, the output transistor. This provides an optically isolated interface to determine at which time the SCR1 is turned off. The method by which this is all monitored makes use of the fact that when the SCR's gate current is removed, the SCR continues to be in conduction until such time as its polarity anode-to-cathode is reversed. This might take several milliseconds to occur, depending on the power line frequency. In the present embodiment there is actual monitoring of the gate voltage which is internally supplied by the SCR in a regenerative effect. This regeneration is going to occur as long as there is proper amplitude and polarity across the SCR under load. By monitoring this gate voltage to see when it falls below 100 millivolts, we have been able to reliably monitor the condition of the SCR to determine when it cuts off or turns off within some 30 microseconds. This is several orders of magnitude more precise than can be done with standard current probes.

In FIG. 10, the basic PTU is shown in a block diagram. The PTU is composed of three sets of terminals, power source phase A, B and C and load terminals A', B' and C'. The PTU is intended to parallel a contactor under the control of a logic controller which controls the switching operation of the PTU. Each element or letter E shown in FIG. 10 is essentially an SCR controlled by one of the device drivers and detectors previously described in FIG. 9. By composing two of these back-to-back, it is possible to get full conduction or 360 degree conduction from power to load through the PTU element. The advantages of all of this is that the PTU is able to shunt the contactor and provide more accurate timing to allow power conduction from one source to a load in such a manner as to be able to control it with minimum outage between transition switching times, whereupon previously, one had to rely upon the mechanical time delay and hysteresis of a mechanical contactor. The logic controller's component within the PTU is a device which simply provides handshaking routines to make sure that the PTU elements between the original PTU and the new PTU are both in handshaking agreement. This allows the PTU to monitor and track the progress of power transition from one source to another. This is described in FIG. 5.

The logic controller 22 shown in FIG. 10 can be a microprocessor which includes a CPU connected by a bus to a memory storing a stored sequence of program steps which perform the function shown in the functional flow diagram of FIG. 11. The functions performed require inputs from each of their respective elements shown in FIG. 10. The functions are performed as indicated in FIG. 11 and control signals are output from the logic controller to the respective elements in the power transfer unit of FIG. 10. It is within the scope of the invention that instead of using a programmed microprocessor for the logic controller of FIG. 10, a hardwired complex logic can be provided to perform the functions illustrated in FIG. 11.

FIG. 8 is an overall circuit diagram of the arrangement of two power transfer units (PTU) 25 and 25' connected so as to enable the transfer of a load 12 from a first power source 14 characterized as the A phase, to a second power source 14' characterized as the A' phase. The switch 18 selectively connects the coil current voltage source 16 over either the conductor 19 to the relay coil 28 for a first relay 10 or alternately it connects the voltage source 16 over the conductor 19' to the coil current 28' of the second relay 10'. The first relay 10 has a corresponding pair of conductor contacts 26 which are operatively actuated by the coil 28 so as to selectively provide a current conducting path between the first power source 14 and the load 12. The second relay 10' has a corresponding pair of relay contacts 26' which are operatively actuated by the coil 28' to selectively connect the second power source 14' to the load 12. The switch 18 is, for example, a double pole single throw switch, so that relay 10 and relay 10' cannot be on at the same time.

Referring to FIG. 1, when contacts 26 are closed, the power is conducted from the power source 14 to the load 12 when the switch 18 is connected to the conductor 19. If, for example, the switch 18 were changed instantaneously to make contact with the alternate conductor 19', the mechanical inertia of contact points for the contacts 26 and the mechanical inertia for the contacts 26' on the second relay 10', will impose a minimum delay in the opening of the relay 10 and the closure of the relay 10'. This is illustrated with the greater than 10 millisecond power outage illustrated in FIG. 1 between the instant when the contacts 26 open and the following later instant when the contacts 26' close. It is this long outage of greater than 10 milliseconds which creates the problem in the prior art and which is cured by the invention.

With reference to FIG. 8, a power transfer unit (PTU) 25 is shown with its terminals connected in parallel at nodes 42 and 44, with the relay contacts 26. Correspondingly, a second power transfer unit 25' has its terminals connected in parallel at nodes 42' and 44' with the relay contacts 26' of the relay 10'. The power transfer unit 25 has the SCR 24 with its primary anode-to-cathode current conducting path connected between the nodes 42 and 44. The gate conductor 32 of the SCR 24 is connected to a first input of the gate driver and detector circuit 20 which is shown in greater detail in FIG. 9.

The power transfer unit shown in FIG. 8 further includes a logic section 22 which has a two input AND gate 36 with a first input connected to the conductor 19 supplying current to the relay coil 28, and it has a second input connected to a 100 microsecond delay 38. Line 34' from the second PTU 25', carries a binary signal indicating that the SCR 24' in the PTU 25' is carrying current, and that binary signal is inverted in the inverter 40 and the add inverted signal is passed through the 100 microsecond delay 38 to the second input of the AND gate 36. The output of the AND gate 36 on line 30 is applied to the light emitting diode IC1 which is a part of the gate driver and detector circuit 20 shown in FIG. 9.

Corresponding elements in the PTU 25' are shown with their reference numerals primed, the PTU 25' being identical, in this example, to the elements in the first PTU 25.

In operation, let us assume that the switch 18 connects the voltage source 16 to the conductor 19 providing coil current to the coil 28 in the relay 10. This causes the contacts 26 to be in a closed state so that current is conducted from the power source 14 to the load 12. The positive potential applied to the coil 28 and producing coil current, is also applied to one input of the AND gate 36, and in this example, since there is no current being conducted through the SCR 24' and the second PTU 25', the binary low signal on line 34' is inverted in the inverter 40 and becomes a binary high signal which is applied through the delay 38 to the second input of the AND gate 36. This provides a positive voltage on line 30, which continuously energizes the LED IC1, which in turn, causes the gate driver and detector circuit of FIG. 9 to provide an output signal on line 34.

With reference to FIG. 9, the gate driver and detector circuit 20 can be seen to have the line 30 supplying current to the light emitting diode IC1 which illuminates its corresponding photo transistor in an opto isolator configuration, thereby causing a relatively positive potential to be applied to the gate of the FET device Q1. This provides a positive potential which is applied to terminal 46 of the comparator IC2. This in turn, provides a signal to a second opto isolator IC3 which provides the output signal on line 34.

Returning now to FIG. 8, in this stage of the example, let the switch 18 be shifted so as to be disconnected from the conductor 19 and to be connected to the second conductor 19'. This terminates the flow of coil current through the coil 28 of the first relay 10 and initiates the flow of current through the coil 28' of the second relay 10'. However, as previously mentioned, because of the mechanical inertia of the contacts 26 in the first relay 10 and of the contacts 26' in the second relay 10', there will be at least a 10 millisecond delay between the opening of the contacts in the first relay 10 and the closure of the contacts in the second relay 10'. However, through the operation of the first PTU 25 and the operation of the second operation of the second PTU 25', the duration of the power outage is reduced from greater than 10 milliseconds, to approximately 100 microseconds or less. This is achieved as follows.

As can be seen in FIG. 9, the gate electrode 32 of the SCR 24 is connected through resistor R18 to the terminal 46 of the comparator IC2. The other terminal 48 of the comparator IC2 is connected to a reference potential of approximately 100 millivolts, in this example. The SCR 24 is a silicon device consisting of P-type doped silicon connected to the anode followed by an N-type layer which in turn is followed by a P-type layer connected to the gate 32, which is then followed by an N-type layer connected to the cathode terminal. If the anode is biased relatively positive with respect to the cathode, current will not flow from the anode to the cathode until an initial positive potential is applied to the gate electrode 32. Once the current passing from the anode to the cathode is greater in magnitude than a sustaining current, then a positive gate potential need no longer be applied and the current will continue to flow until the magnitude of the anode-to-cathode current falls below the sustaining current magnitude. The PN junction between the gate electrode and the cathode accumulates a charge in a manner similar to a parallel plate capacitor when current is flowing from the anode to the cathode. The potential difference between the gate electrode 32 and the cathode during periods when normal operating currents are flowing from the anode to the cathode, is on the order of 0.7 volts, the forward bias diode drop for a silicon diode. In accordance with the invention, by monitoring the potential difference between the gate and the cathode, the termination of the current flowing from the anode to the cathode can be determined. The electrode 32 of the SCR 24, as is shown in FIG. 9, is connected to the terminal 46 of the comparator IC2. The terminal 48 of the comparator IC2 is connected to a reference potential of approximately 0.1 volt. Therefore, when the current flowing between the anode and the cathode of the SCR 24 drops to substantially zero amperes, the potential difference between the gate electrode 32 and the cathode, as is sensed by the terminal 46 of the comparator IC2, falls below 0.1 volts, the reference potential applied to terminal 48. This causes the comparator IC2 to cease providing an output signal to the opto isolator IC3, thereby terminating the output signal on line 34. Thus begins the 100 microsecond outage interval shown in FIG. 2.

The transition from a positive level to a low level for the output signal on line 34 is inverted by the inverter 40' in the second PTU 25' and is passed through the 100 microsecond delay 38'. It is the delay 38' which governs the duration of the outage shown in FIG. 2. After the 100 microsecond delay imposed by the delay 38', the positive going signal is then applied to the second input of the two input AND gate 36'. Since the switch 18 in the second stage of the example, is now connected to the conductor 19', a positive signal is available at the first input to the AND gate 36', thereby satisfying the AND gate and a positive signal is now applied on line 30' to the LED IC1' of the gate driver and detector circuit 20' of the second PTU 25'. Referring to FIG. 9, consider the circuit diagram as representing the gate driver and detector circuit 20' of the PTU 25', the opto isolator IC1 is energized and the FET device Q1 applies a gate potential over the conductor 32' to the gate electrode of the second SCR 24', thereby turning on the SCR 24', thereby allowing the second power source 14' to apply its current through the SCR 24' to the load 12. Thus, current can be restored to the load 12 with less than a 100 microsecond delay, even though the mechanical inertia of the contacts 26' for the second relay 10', are still in the process of closing and have not yet electrically closed. After the relay contacts 26' of the second relay 10' are closed, the relay 10' provides the parallel path between the power source 14' and the load 12, providing current to the load 12. It is optional whether the SCR 24' is kept on, and in alternate embodiments of the invention, the SCR 24' can be turned off after the relay contacts 24' are closed, in order to minimize the power dissipation which can occur from the flow of current through the SCR 24' and the operation of the gate driver and circuit 20'.

The embodiment shown in FIG. 8 accommodates half wave current conduction in the A phase and half wave current conduction in the A' phase. For a full wave current connection, the A phase would have two PTUs 25 with the first PTU having its SCR polarity as is shown in FIG. 8 and the second PTU having its SCR connected in parallel but oppositely polarity to the SCR 24. Correspondingly, a second PTU of oppositely polarity to the PTU 25' would also be used for full wave handling of the A' phase.

If three phase, full wave current handling is desired, then a total of 12 PTUs ganged six each would be employed, as is schematically shown in FIG. 3.

Some discussion of the operation of the invention can be given as follows, in conjunction with FIGS. 12 and 13. FIG. 12 is a schematic or symbolic diagram of the SCR 24 which shows in particular its internal construction with the anode 80 connected to a P-type region 84 which in turn is joined through a PN junction to an N-type region 86, which in turn is joined through a PN junction to a P-type region 88, which in turned is joined through a PN junction to an N-type region 90. The P-type region 88 has connected to it the gate electrode 32 and the N-type region 90 has connected to it the cathode 82. The operation of an SCR is well-known to the prior art and can be characterized as follows. An SCR has three features which characterize its operation, the first being that a gate trigger current at terminal 32 is required to initiate a regeneration state so that the primary current from the anode to the cathode will flow. A second characteristic of an SCR is that a minimum principal current from the anode to the cathode, frequently referred to as a "latching current," must be available to sustain regeneration in the PN junction between the P-type region 88 and the N-type region 90. A third characteristic of SCRs is that a reduction in the principal current flow between the anode 80 and the cathode 82 will result in the turn-off at some level of current flow which is often referred as the "holding current," whose magnitude is slightly greater than zero. What has been discovered by the inventor of the invention described herein, is that there is an off-state gate voltage threshold value which can be measured between the gate terminal 32 and the cathode 82, below which, one can be assured that no further current is flowing between the anode 80 and the cathode 82. For a typical silicon controlled rectifier made of silicon material, the forward bias diode drop between the P-type region 88 and the N-type region 90 is 0.7 volts when full current is flowing from the anode 80 to the cathode 82. It has been found by the inventor that when the current from the anode to the cathode drops to substantially zero, this can be detected by measuring a potential difference between the gate 32 and the cathode 82 of less than 0.1 volt. This is the principle of operation which is shown in FIG. 13. This is also the principle which allows the gate detection and driver circuit 20 to monitor the current conducting state of the SCR 24 and generate a switchover signal to indicate that current flow has terminated from the anode 80 to the cathode 82 of the SCR 24.

Although a specific embodiment of the invention has been disclosed, it will be understood by those having skill in the art that changes can be made to that specific embodiment without departing from the spirit and the scope of the invention.

What is claimed is:

1. A power transfer ;unit for transferring power from a first power source connected to a load to a second power source connected to said load, comprising;
    a first SCR device having its anode-cathode path connected between a first power source and the load and having a gate terminal, and a second SCR device having its anode-cathode path connected between a second power source and said load and having a gate terminal;
    a first gate conduction detector coupled between said gate terminal and said cathode of said first SCR device, and having an output terminal;
    a second gate conduction detector coupled between said gate terminal and said cathode of said second SCR device;
    a logic control circuit having an input connected to the output of said gate conduction detector and having an output coupled to said gate of said second SCR device;
    said first gate conduction detector outputting a signal to said logic control circuit when the voltage between said gate and said cathode of said first SCR device is lower than a predetermined threshold voltage, corresponding to a minimal current flowing through said anode-cathode path of said first SCR device;
    said logic control circuit, in response to receiving said signal from said first gate conduction detector, instituting a predetermined delay time interval followed by outputting a gate energizing signal which is coupled through said second gate conduction detector to said gate electrode of said second SCR device; and
    whereby a precise outage interval is realized between the conduction of said first SCR device and the conduction of said second SCR device.

2. The apparatus of claim 1 which further comprises:
    a first relay having an energizing coil with its contacts connected in parallel with said first SCR device and a second relay having its contacts connected in parallel with said second SCR device;
    the energizing coil of said first relay being coupled to said logic control circuit; and
    said logic control circuit detecting when current through said coil of said first relay is off, thereby initiating in response thereto a long delay time interval longer than said predetermined delay time interval.

3. The apparatus of claim 2 wherein said logic control circuit comprises:
    an invertor connected to the output of the first gate conduction detector and having an output;
    a delay timer connected to the output of said invertor and having an output; and
    a two input AND gate connected to the output of the delay timer, the output of the AND gate coupled to the second gate conduction detector.

4. The apparatus of claim 1 wherein the predetermined threshold voltage is set at 100 millivolts.

5. The apparatus of claim 3 wherein the delay timer is set at 100 microseconds.

* * * * *